United States Patent
Irie et al.

(10) Patent No.: US 8,825,212 B2
(45) Date of Patent: Sep. 2, 2014

(54) ROBOT SYSTEM

(75) Inventors: Toshimitsu Irie, Fukuoka (JP); Tetsuya Yoshida, Fukuoka (JP); Shinji Murai, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 190 days.

(21) Appl. No.: 13/410,249

(22) Filed: Mar. 1, 2012

(65) Prior Publication Data

US 2012/0296474 A1  Nov. 22, 2012

(30) Foreign Application Priority Data

May 17, 2011  (JP) .................................. 2011-110079

(51) Int. Cl.
*G06F 7/00*  (2006.01)
*G05B 19/418*  (2006.01)
*G05B 15/00*  (2006.01)
*B25J 9/16*  (2006.01)

(52) U.S. Cl.
CPC ..... *B25J 9/1687* (2013.01); *G05B 2219/39102* (2013.01); *G05B 2219/40053* (2013.01)
USPC ........... 700/259; 700/213; 700/214; 700/230; 700/245; 700/247; 700/248; 700/258

(58) Field of Classification Search
CPC ...... B25J 9/1679; B25J 9/1697; B65G 43/08; G05B 19/2182; B05B 2219/37555; B05B 2219/39508; B05B 2219/40014; B05B 2219/40053
USPC ......... 700/213, 214, 230, 245, 247, 248, 258, 700/259; 414/14; 901/7, 16; 198/340, 341, 198/341.06, 346.2, 401, 416, 502.3, 571, 198/572, 573; 209/903
See application file for complete search history.

(56) References Cited

U.S. PATENT DOCUMENTS

| | | | | |
|---|---|---|---|---|
| 6,328,523 | B1 * | 12/2001 | Watanabe et al. | 414/416.01 |
| 6,694,220 | B1 * | 2/2004 | Tanz | 700/226 |
| 7,123,992 | B2 * | 10/2006 | Ban et al. | 700/258 |
| 7,203,573 | B2 * | 4/2007 | Ban et al. | 700/258 |
| 7,313,464 | B1 * | 12/2007 | Perreault et al. | 700/245 |
| 7,996,114 | B2 * | 8/2011 | Ban et al. | 700/259 |
| 8,295,975 | B2 * | 10/2012 | Arimatsu et al. | 700/216 |
| 8,559,699 | B2 * | 10/2013 | Boca | 382/153 |

FOREIGN PATENT DOCUMENTS

| | | |
|---|---|---|
| EP | 0951968 | 10/1999 |
| EP | 1418025 | 5/2004 |
| JP | 05-127722 | 5/1993 |

(Continued)

OTHER PUBLICATIONS

Japanese Decision of a Patent Grant for corresponding JP Application No. 2011-110079, Jun. 11, 2013.

(Continued)

*Primary Examiner* — Khoi Tran
*Assistant Examiner* — Robert Nguyen
(74) *Attorney, Agent, or Firm* — Mori & Ward, LLP

(57) ABSTRACT

A robot system according to an embodiment includes a robot a switching determination unit and a rearrangement instruction unit The switching determination unit performs determination of switching between the operation of transferring the workpiece and the operation of rearranging the workpiece based on the state of transferring the workpiece by the robot The rearrangement instruction unit instructs the robot to rearrange the workpiece.

9 Claims, 8 Drawing Sheets

(56) References Cited

FOREIGN PATENT DOCUMENTS

| | | |
|---|---|---|
| JP | 11-300670 | 11/1999 |
| JP | 2004-160567 | 6/2004 |
| JP | 2008-062376 | 3/2008 |
| JP | 2010-207989 | 9/2010 |

OTHER PUBLICATIONS

Japanese Office Action for corresponding JP Application No. 2011-110079, Apr. 16, 2013.
Extended European Search Report for corresponding EP Application No. 12157608.6 —1239, Jan. 21, 2013.

* cited by examiner

ROBOT SYSTEM

CROSS-REFERENCE TO RELATED APPLICATION

This application is based upon and claims the benefit of priority of the prior Japanese Patent Application No. 2011-110079, filed on May 17, 2011; the entire contents of which are incorporated herein by reference.

FIELD

The embodiment discussed herein is directed to a robot system.

BACKGROUND

Conventionally, there has been known a robot system that takes out and transfers members (hereinafter, referred to as a "workpiece") loaded randomly on a place such as a box-shaped tray for storing thereon materials to be worked (hereinafter, collectively referred to as a "pallet").

Regarding such a robot system, for example, there has been developed a technique for taking an image of the workpiece loaded randomly on the pallet with a camera and taking out the workpiece based on the image thus taken.

As documents related to the above-mentioned conventional technique, for example, see Japanese Patent Application Laid-open No. H11-300670 and Japanese Patent Application Laid-open No. H5-127722.

SUMMARY

A robot system according to an embodiment includes a robot, a switching determination unit, and a rearrangement instruction unit. The switching determination unit performs determination of switching between the operation of transferring the workpiece and the operation of rearranging the workpiece based on the state of transferring the workpiece by the robot. The rearrangement instruction unit instructs the robot to rearrange the workpiece.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an embodiment of a robot system disclosed in the present application is explained in detail in reference to the attached drawings. Here, the present embodiment is not limited to examples in the embodiment described below.

Figure 1:
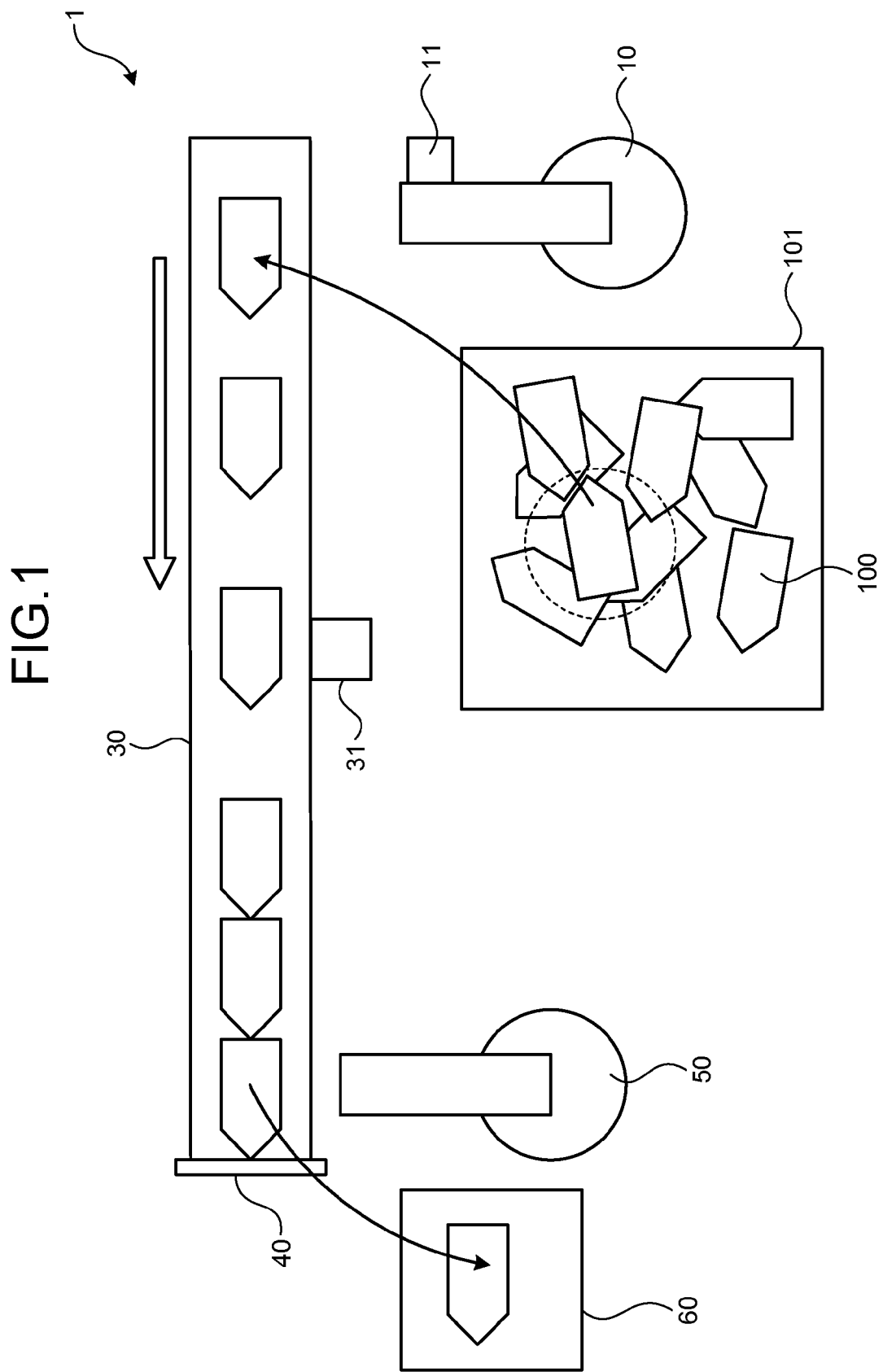
FIG. 1 is an explanatory drawing of a robot system according to the present embodiment.

First of all, a robot system 1 according to the present embodiment is explained in conjunction with FIG. 1. FIG. 1 is an explanatory drawing of the robot system 1 according to the present embodiment. Here, in FIG. 1, to make the explanation easy to understand, the structure of the robot system 1 is partially simplified.

As shown in FIG. 1, the robot system 1 according to the present embodiment includes a conveyance passage 30, a robot 10 installed upstream of the conveyance passage 30, and a robot 50 installed downstream of the conveyance passage 30. In addition, the upstream-side robot 10 further includes a camera 11, and the conveyance passage 30 further includes a sensor 31.

Furthermore, in the vicinity of the upstream-side robot 10, a pallet 101 on which one or a plurality of workpieces 100 are loaded randomly is installed and, in the vicinity of the downstream-side robot 50, a working machine 60 that processes the workpieces 100 is installed.

The robot system 1 detects the workpiece 100 allowed to be taken out from the pallet 101 based on an image taken with the camera 11 mounted on the robot 10. Furthermore, the robot system 1 instructs, when the workpiece 100 allowed to be taken out is detected, the robot 10 to take out the workpiece 100 so as to transfer the workpiece 100 to the place upstream of the conveyance passage 30.

On the other hand, the robot 10 takes out, in response to the instruction from the robot system 1 that detects the workpiece 100 allowed to be taken out, the workpiece 100 from the pallet 101 and transfers the workpiece 100 to the place upstream of the conveyance passage 30.

When it is impossible to detect the workpiece allowed to be taken out, it is effective that the robot system 1 instructs the robot 10 to shake the workpieces 100 or the pallet 101, so that the workpieces 100 are rearranged.

Thereafter, the processing for detecting the workpiece 100 allowed to be taken out is performed again, and such a detection processing is repeatedly performed until the workpiece 100 is detected.

However, when comparing a case that the detection processing is repeatedly performed with another case that the workpiece 100 allowed to be taken out is detected on the first try, the time per one cycle until the workpiece 100 is taken out in the former case extremely differs from that in the latter case.

Therefore, when the detection processing is repeated frequently, the workpiece 100 to be taken out is not accumulated downstream of the conveyance passage 30. Hence, there can also exist the case that a waiting time is generated in the downstream-side robot 50.

Therefore, the Robot system 1 according to the present embodiment switches whether the workpiece 100 loaded on the pallet 101 is transferred or a rearrangement processing is performed based on the state of the workpieces 100 transferred; for example, the state of the workpieces 100 accumulated on the conveyance passage 30. Here, the rearrangement processing is to perform the operation such that the workpiece 100 placed in the area close to the wall of the pallet 101 is moved to the central area of the pallet 101.

To be more specific, the robot system 1 detects the number of the workpieces 100 accumulated downstream of the conveyance passage 30 with the sensor 31 mounted on the conveyance passage 30. Furthermore, the robot system 1 instructs, when the number of the workpieces 100 is equal to or greater than a given threshold; that is, when a sufficient number of the workpieces 100 that satisfy the demand for the workpieces 100 downstream of the conveyance passage 30 are supplied from the upstream side of the conveyance passage 30, the robot 10 to rearrange the workpieces 100 loaded on the pallet 101.

In this manner, in the robot system 1, the frequency of failures of searching the workpiece 100 allowed to be taken out is considerably reduced; that is, it is possible to reduce the time per one cycle until the workpiece 100 is taken out. Here, the rearrangement processing is specifically explained later in conjunction with FIG. 6.

Hereinafter, the constitutional example of the robot system 1 including the downstream side of the conveyance passage 30 is explained. The conveyance passage 30 is constituted of a conveyor or the like and conveys the workpieces 100 from the upstream side to the downstream side thereof as illustrated by the white bordered arrow in FIG. 1.

Furthermore, the conveyance passage 30 includes a stopper 40 mounted downstream for preventing the workpiece 100 from being conveyed to the downstream side from the position on which the stopper 40 is mounted. Due to such a constitution, the workpieces 100 are sequentially accumulated on the conveyance passage 30 in a state that the workpieces 100 are aligned from the position of the stopper 40 to the upstream side of the conveyance passage 30.

The downstream-side robot 50 takes out the workpiece 100 accumulated downstream of the conveyance passage 30 in response to the instruction from the robot system 1 and transfers the workpiece 100 onto the place in which the next process is performed. For example, as illustrated in FIG. 1, the downstream-side robot 50 transfers the workpiece 100 onto the working machine 60 that processes the workpiece 100.

Here, in the present embodiment, the downstream-robot 50 transfers the workpiece 100 onto the working machine 60. However, the present embodiment is not limited to the embodiment. For example, the downstream-side robot 50 may set the workpiece 100 in the other component.

In this manner, the robot system 1 according to the present embodiment performs, when a sufficient number of the workpieces 100 that satisfy the demand for the workpieces 100 downstream of the conveyance passage 30 are accumulated on the conveyance passage 30, the rearrangement processing of the workpieces 100.

Due to such a constitution, in the robot system 1 according to the present embodiment, the time per one cycle until the workpiece 100 is taken out is reduced and hence, it is possible to reduce the total pickup time for the workpieces 100 loaded on the pallet 101 randomly.

Figure 2:
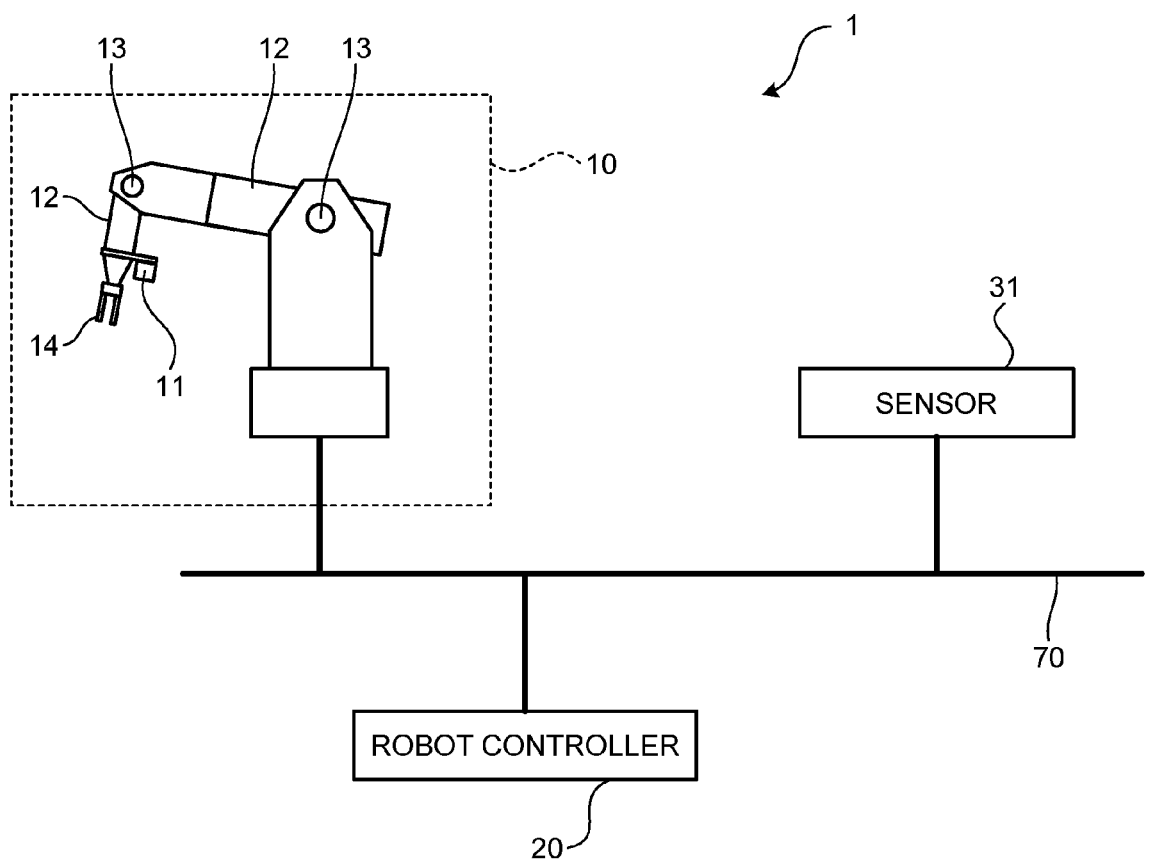
FIG. 2 is a drawing illustrating a constitution of the robot system according to the present embodiment.

Next, the constitution of the robot system 1 according to the present embodiment is explained in conjunction with FIG. 2. FIG. 2 is a drawing illustrating the constitution of the robot system 1 according to the present embodiment. As illustrated in FIG. 2, the robot system 1 includes the robot 10, a robot controller 20, and the sensor 31.

Furthermore, as illustrated in FIG. 2, the robot 10, the robot controller 20, and the sensor 31 are connected with one another via a communication network 70. Here, as the communication network 70, a general network such as a wired LAN (Local Area Network) or a wireless LAN can be used.

The robot 10 has a plurality of robot arms 12, and each robot arm 12 is connected with another robot arm 12 by way of a joint part 13 including a servo motor (not illustrated in the drawings).

Furthermore, the robot arm 12 has a robot hand 14 at its end as an end effector, and the robot hand 14 includes the camera 11 for detecting the workpieces 100 to be transferred. The camera 11 is an image pickup device capable of performing non-contact three-dimensional measurements of the state of the workpieces 100 loaded on the pallet 101; for example, a device such as a multi-scan 3D (Dimensions) camera.

The robot 10 individually rotates each servo motor by any angle in response to the transfer instruction from the robot controller 20 or the like thus moving the robot hand 14 to any position for transferring the workpiece 100.

The robot controller 20 is a controller that performs motion control of the robot 10. For example, the robot controller 20 controls the robot 10 to rearrange the workpieces 100 based on the number of the workpieces 100 detected by the sensor 31 on the conveyance passage 30.

Figure 3:
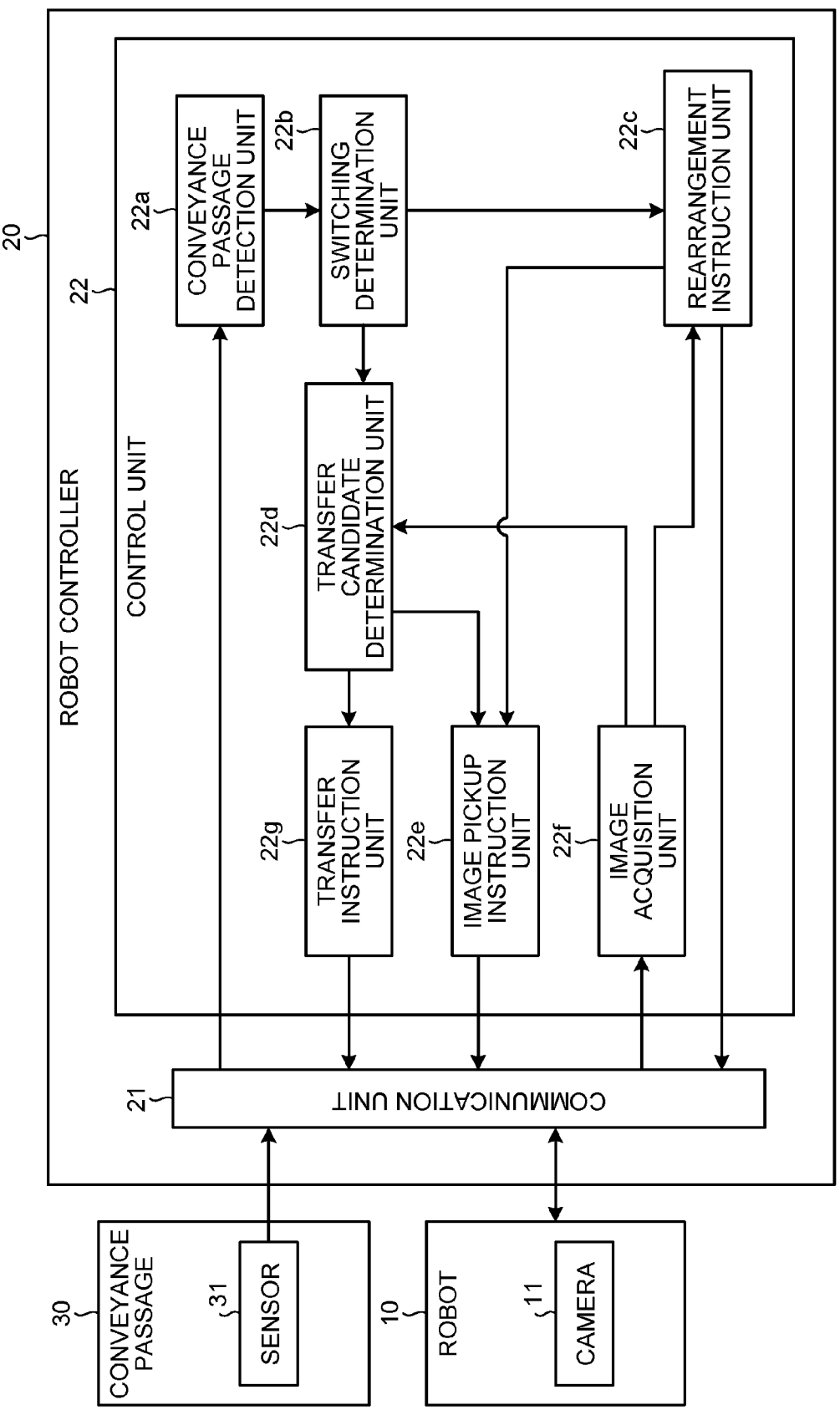
FIG. 3 is a block diagram illustrating a configuration of a robot control device according to the present embodiment.

Next, a configuration of the robot controller 20 according to the present embodiment is specifically explained in conjunction with FIG. 3. FIG. 3 is a block diagram illustrating the configuration of the robot controller 20 according to the present embodiment. As illustrated in FIG. 3, the robot controller 20 includes a communication unit 21 and a controller 22.

In addition, the controller 22 further includes a conveyance passage detection unit 22a, a switching determination unit 22b, a rearrangement instruction unit 22c, a transfer candidate determination unit 22d, an image pickup instruction unit 22e, an image acquisition unit 22f, and a transfer instruction unit 22g.

The communication unit 21 is a communication device such as a LAN board that performs data transmission and reception between the robot 10 and the robot controller 20. The communication unit 21 performs the processing that provides data received from the robot 10 to the controller 22 and, at the same time, performs the processing that transmits data received from the controller 22 to the robot 10.

Furthermore, the communication unit 21 performs data transmission and reception between the robot 10 and the sensor 31 mounted on the conveyance passage 30 and also performs the processing for providing data received from the sensor 31 to the controller 22.

The controller 22 is a controller that entirely controls the robot controller 20. The conveyance passage detection unit 22a receives the detection information of the workpieces 100 passing through the conveyance passage 30 from the sensor 31 mounted on the conveyance passage 30 and detects the number of the workpieces 100 accumulated downstream of the conveyance passage 30 based on the detection information.

To be more specific, the conveyance passage detection unit 22a subtracts the number of the workpieces 100 taken out by the downstream-side robot 50 from the total number of the workpieces 100 passing through the conveyance passage 30 to detect the number of the workpieces 100 accumulated downstream of the conveyance passage 30. Furthermore, the conveyance passage detection unit 22a also performs the processing for providing the number of the workpieces 100 detected to the switching determination unit 22b.

Here, in this embodiment, the sensor 31 mounted on the conveyance passage 30 detects the number of the workpieces 100 accumulated downstream of the conveyance passage 30. However, it may be possible to adopt the constitution such that a camera is set in the vicinity of the conveyance passage 30 to take an image of the workpieces 100 on the conveyance passage 30, and the conveyance passage detection unit 22a detects the number of the workpieces 100 based on the image, which is taken with the camera, of the workpieces 100 on the conveyance passage 30.

Furthermore, the robot system 1 may detect the number of the workpieces 100 on the conveyance passage 30 without using the sensor 31 or the camera. For example, the conveyance passage detection unit 22a may calculate the number of the workpieces 100 on the conveyance passage 30 based on the number of the workpieces 100 transferred to the conveyance passage 30 by the upstream-side robot 10 and the number of the workpieces 100 taken out by the downstream-side robot 50.

The switching determination unit 22b is a processing unit that performs a determination processing for switching whether the workpiece 100 loaded on the pallet 101 is transferred or the rearrangement processing is performed based on the transfer state of the workpieces 100; for example, the state of the workpieces 100 accumulated on the conveyance passage 30.

For example, the state of the workpieces 100 accumulated on the conveyance passage 30 may be the number of the workpieces 100 accumulated on the conveyance passage 30 or the sequential condition of the workpieces 100 on the conveyance passage 30. Hereinafter, an example when the state of the workpieces 100 accumulated on the conveyance passage 30 intends to the number of the workpieces 100 on the conveyance passage 30 is explained.

The switching determination unit 22b receives information of the number of the workpieces 100 accumulated downstream of the conveyance passage 30 from the conveyance passage detection unit 22a. The switching determination unit 22b is a processing unit for determining whether the workpieces 100 loaded on the pallet 101 are rearranged based on the information.

To be more specific, the switching determination unit 22b determines that, when the number of the workpieces 100 is equal to or greater than the given threshold, a sufficient number of the workpieces 100 that satisfies the demand for the workpieces 100 downstream of the conveyance passage 30 are supplied from the upstream side of the conveyance passage 30. Thereafter, the workpieces 100 loaded on the pallet 101 are rearranged.

Furthermore, the switching determination unit 22b also performs, when determining that the workpieces 100 are to be rearranged, the processing for instructing the rearrangement of the workpieces 100 to the rearrangement instruction unit 22c. On the other hand, the switching determination unit 22b notifies, when determining that the workpieces 100 are not to be rearranged, the transfer candidate determination unit 22d to perform the processing of transferring the workpieces 100.

The rearrangement instruction unit 22c instructs, first of all, when receiving the instruction for rearranging the workpieces 100 from the switching determination unit 22b, the image pickup instruction unit 22e to take an image of the state of the workpieces 100 placed in the partial area including the area close to the wall of the pallet 101.

Furthermore, the rearrangement instruction unit 22c acquires the image taken with the camera 11 via the image acquisition unit 22f. Thereafter, the rearrangement instruction unit 22c detects the workpieces 100 placed in the area close to the wall of the pallet 101 based on the acquired image.

Furthermore, the rearrangement instruction unit 22c instructs, when detecting the workpieces 100 placed in the area close to the wall of the pallet 101, the robot 10 to perform the operation such that the workpieces 100 are moved to the central area of the pallet 101, and the workpieces 100 are rearranged. Here, the rearrangement processing is specifically explained later in conjunction with FIG. 5.

The transfer candidate determination unit 22d instructs, when receiving the notice of transferring the workpieces 100 from the switching determination unit 22b, first of all, the image pickup instruction unit 22e to take an image of the state of the workpieces 100 loaded on the pallet 101 with the camera 11 for detecting the workpiece 100 allowed to be taken out. Here, the transfer candidate determination unit 22d instructs the image pickup instruction unit 22e to preferentially take an image of the workpieces 100 placed in the high-priority partial area of the pallet 101.

In addition, the transfer candidate determination unit 22d acquires the image taken with the camera 11 via the image acquisition unit 22f to convert the state of the workpieces 100 into three-dimensional coordinate information. Furthermore, the transfer candidate determination unit 22d determines the workpiece 100 allowed to be transferred based on the coordinate information obtained by conversion.

Thereafter, the transfer candidate determination unit 22d provides notification of the determined workpiece 100 allowed to be transferred to the transfer instruction unit 22g. Here, the processing for determining the workpiece 100 allowed to be transferred is specifically explained later in conjunction with FIG. 4A, FIG. 4B, FIG. 4C, and FIG. 4D.

Here, in this embodiment, the transfer candidate determination unit 22d analyzes the image taken with the camera 11 to convert the state of the workpieces 100 into the three-dimensional coordinate information. However, the sensors etc may convert such three-dimensional coordinate information and provide notification of the coordinate information to the controller 22.

The image pickup instruction unit 22e is a processing unit that performs the processing for instructing the robot 10 to take an image of the state of the workpieces 100 loaded on the pallet 101 with the camera 11. The image acquisition unit 22f is a processing unit that performs the processing for acquiring the image, which is taken with the camera 11, of the state of the workpieces 100 loaded on the pallet 101 and provides the image to the rearrangement instruction unit 22c or the transfer candidate determination unit 22d.

The transfer instruction unit 22g is a processing unit that instructs, when the transfer candidate determination unit 22d determines the workpiece 100 allowed to be transferred, the robot 10 to transfer the workpiece 100 allowed to be transferred to the upstream side of the conveyance passage 30.

Figure 4A:
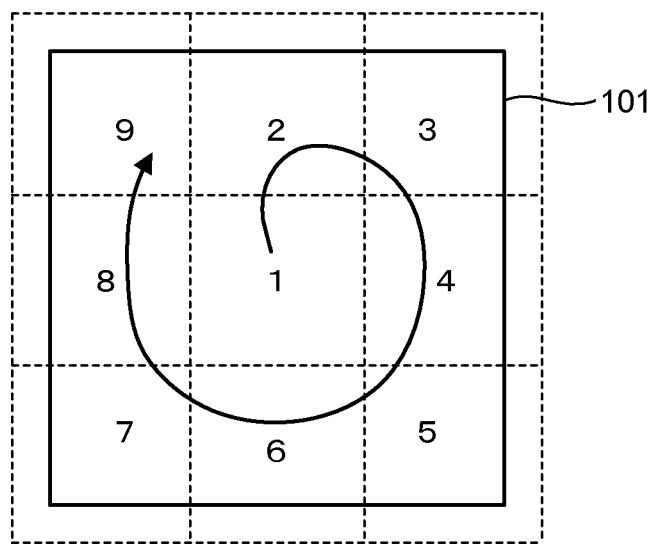
FIG. 4A, FIG. 4B, and FIG. 4D are views of pallets as viewed from directly above.
Figure 4B:
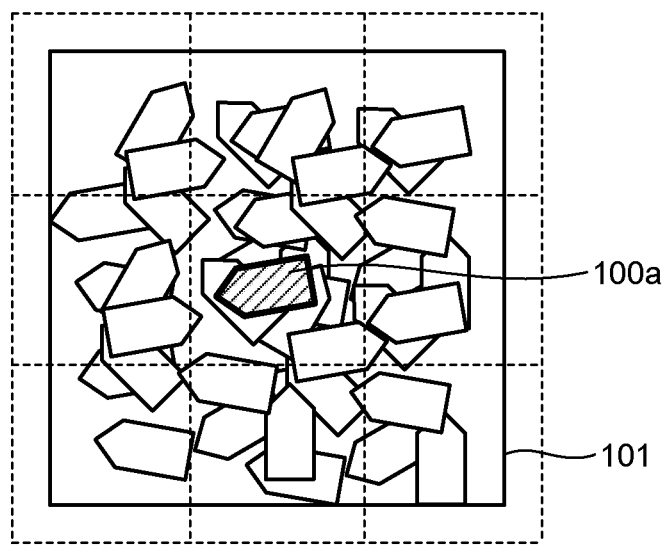
Figure 4C:
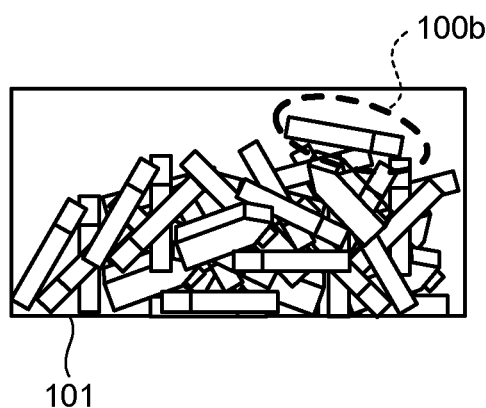
FIG. 4C is a side view of the pallet.
Figure 4D:
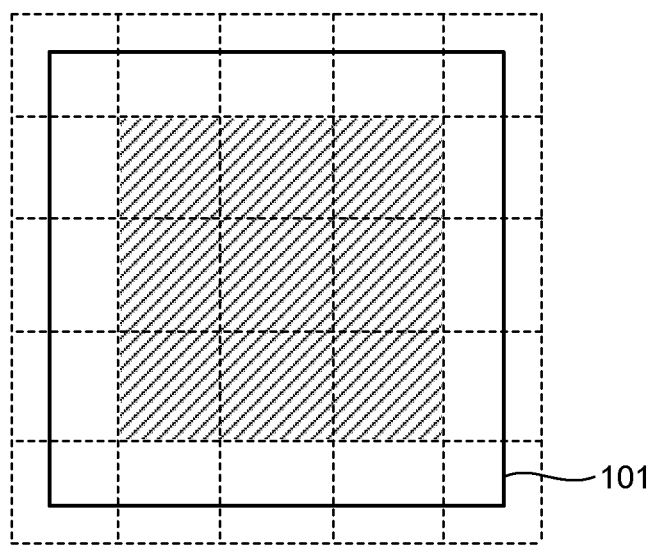

Next, the processing for determining the workpiece 100 allowed to be transferred is specifically explained in conjunction with FIG. 4A, FIG. 4B, FIG. 4C, and FIG. 4D. Here, FIG. 4A, FIG. 4B, and FIG. 4D are views of pallet 101 as viewed from directly above, and FIG. 4C is a side view of the pallet 101.

In the robot system 1, when a dimension in the perpendicular direction of the pallet 101 is defined as a height, the workpiece 100 placed at the higher position of the pallet 101 is preferentially determined as a workpiece 100 allowed to be transferred.

Here, in the robot system 1, the workpiece 100 allowed to be transferred is determined based on the image taken with the camera 11 capable of three-dimensional measurement. However, in the camera 11 capable of three-dimensional measurement, the wider the image pickup range is, the longer the processing time of the three-dimensional measurement becomes.

Accordingly, in the robot system 1, as indicated by broken lines in FIG. 4A, the top surface area of the pallet 101 is divide into a given number of the partial area, and the workpiece 100 allowed to be transferred is determined based on the image taken in each partial area. Due to such a constitution, in the robot system 1, it is possible to reduce the processing time of the three-dimensional measurement.

Furthermore, the robot system 1 sets priority to divided partial areas, and the images of the workpieces 100 in the respective partial areas are taken in descending order of priority of the partial area. For example, when the robot system 1 sets priorities to the respective partial areas in descending order from the partial area further away from the wall surface of the pallet 101, the priorities are set as illustrated in FIG. 4A.

Therefore, the robot system 1 determines the workpiece 100 allowed to be transferred in the order indicated by an arrow in FIG. 4A. Here, FIG. 4a illustrates the case that the pallet 101 is divided into nine (9) partial areas. However, in the present embodiment, the number of divisions is not limited to this case.

Furthermore, the case illustrated in FIG. 4B will be explained in which, out of the workpieces 100 loaded on the pallet 101, the workpiece 100a is placed at the highest position, and the priority same as that illustrated in FIG. 4A is set. In this case, the transfer candidate determination unit 22d determines that the workpiece 100a is the workpiece allowed to be transferred.

Subsequently, as illustrated in FIG. 4C, when the workpiece 100b is placed at the highest position in the pallet 101, the transfer candidate determination unit 22d determines that the workpiece 100b is the workpiece allowed to be transferred.

Here, as described above, the robot system 1 sets priorities to the all partial areas. However, the present embodiment is not limited to this case. For example, as illustrated in FIG. 4D, the pallet 101 may be divided into 25 partial areas, and only the partial areas not including the wall surface (hatched area) may be defined as areas to be searched, and the robot system 1 may set priorities to such partial areas.

Furthermore, in the robot system 1, the area including the wall surface (area without hatching) is defined as the partial area subject to the rearrangement processing. Here, this embodiment is explained by taking the box-shaped pallet 101 surrounded in all directions by the walls. However, the pallet 101 partially surrounded by the walls may be used.

Figure 5:
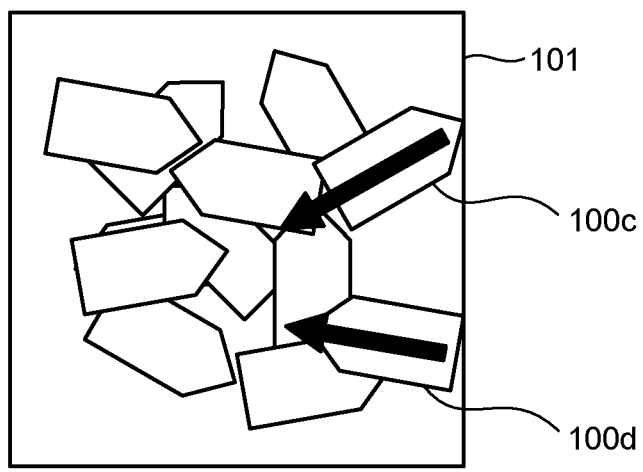
FIG. 5 is an explanatory drawing of a rearrangement processing.

Next, the rearrangement processing performed by the robot system 1 is explained in detail in conjunction with FIG. 5. FIG. 5 is an explanatory drawing of the rearrangement processing with a view of the pallet 101 as viewed from directly above.

The switching determination unit 22b determines that, when the number of the workpieces 100 accumulated downstream of the conveyance passage 30 is equal to or greater than the given threshold, the workpieces 100 loaded on the pallet 101 are rearranged. When the switching determination unit 22b determines that the workpieces 100 are rearranged, the rearrangement instruction unit 22c rearranges the workpieces 100 placed at the position close to the wall of the pallet 101.

To be more specific, as illustrating in FIG. 5, a workpiece 100c and a workpiece 100d are placed at the position close to the wall of the pallet 101. In this case, in the robot system 1, the robot hand 14 is inserted between the workpiece 100c and the wall surface and, as indicated by a black bordered arrow in FIG. 5, the robot hand 14 moves the workpiece 100c to the central area of the pallet 101.

Furthermore, in the robot system 1, the robot hand 14 also moves the workpiece 100d to the central area of the pallet 101 in the same manner as the case of the workpiece 100c. Due to such a constitution, when the workpiece 100 loaded on the pallet 101 is taken out, it is possible to suppress failures of the transfer processing.

Figure 6:
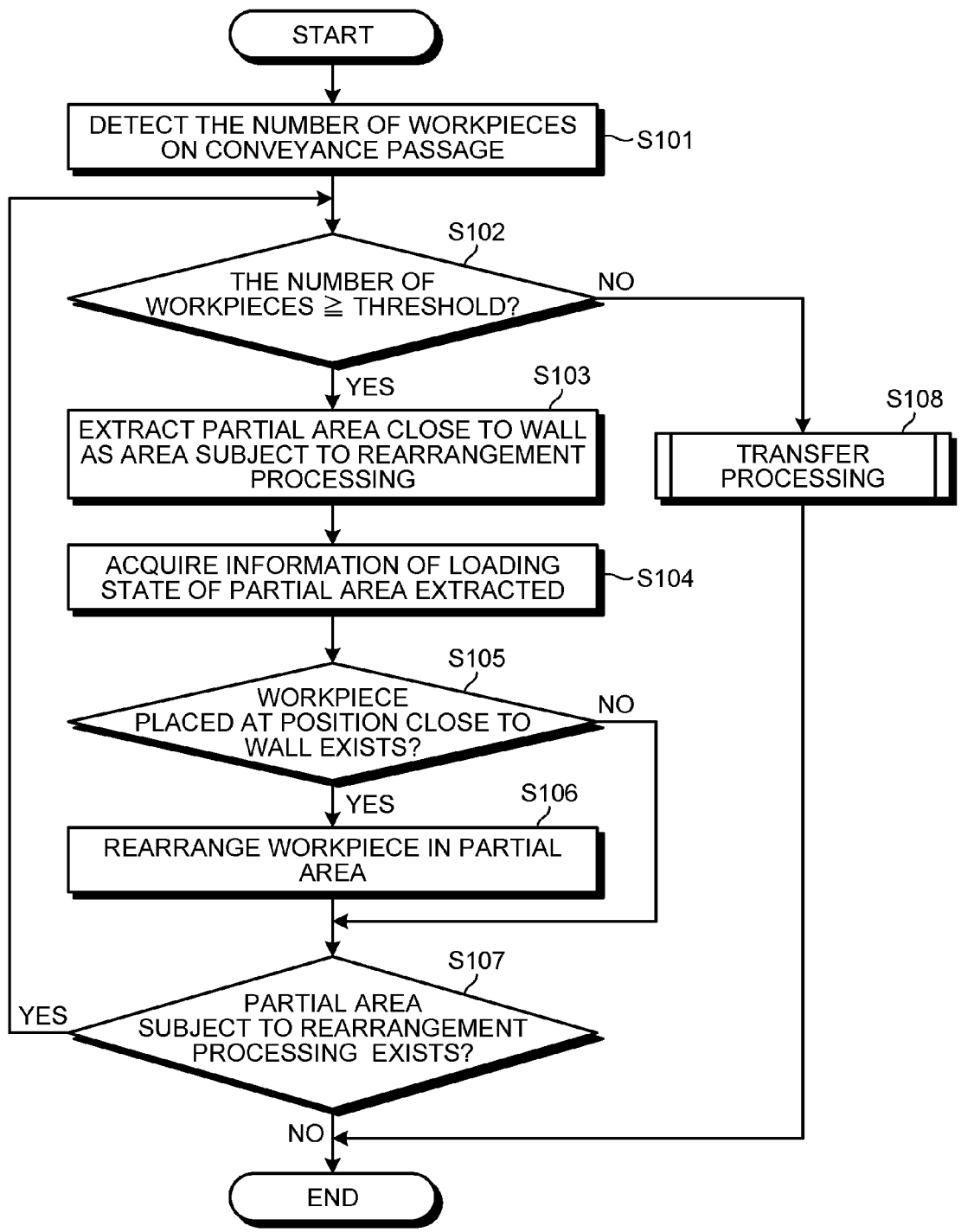
FIG. 6 is a flowchart illustrating processing procedures of the rearrangement processing.

Next, processing procedures of the rearrangement processing performed by the robot system 1 is explained in conjunction with FIG. 6. FIG. 6 is a flowchart illustrating the processing procedures of the rearrangement processing.

As illustrated in FIG. 6, the conveyance passage detection unit 22a detects the number of the workpieces 100 accumulated downstream of the conveyance passage 30 (step S101). Furthermore, the switching determination unit 22b determines whether the number of the workpieces 100 is equal to or greater than the given threshold (step S102).

The rearrangement instruction unit 22c extracts, when the switching determination unit 22b determines that the number of the workpieces 100 is equal to or greater than the given threshold (Yes at step S102), the partial area close to the wall as an area subject to the rearrangement processing (step S103).

Furthermore, the rearrangement instruction unit 22c instructs the robot 10 to take an image of the partial area extracted and acquires the loading state of the workpieces 100 placed in the partial area based on the image taken with the camera 11 (step S104).

Subsequently, the rearrangement instruction unit 22c determines whether the workpiece 100 is placed at the position close to the wall of the pallet 101 based on the loading state acquired (step S105). The rearrangement instruction unit 22c instructs, when determining that the workpiece 100 is placed at the position close to the wall of the pallet 101 (Yes at step S105), the robot 10 to rearrange the workpiece 100, and the workpiece 100 placed in such a partial area is rearranged (step S106).

Furthermore, the rearrangement instruction unit 22c advances, when determining that no workpiece 100 is placed at the position close to the wall of the pallet 101 (No at step S105), the processing thereof to step S107.

The rearrangement instruction unit 22c determines whether the extracted partial area subject to the rearrangement processing exists (step S107). When determining that the partial area subject to the rearrangement processing exists (Yes at step S107), the rearrangement instruction unit 22c repeatedly performs the processing from step S102 to step S107.

On the other hand, the rearrangement instruction unit 22c terminates, when determining that the partial area subject to the rearrangement processing does not exist (No at step S107), a series of steps in the rearrangement processing.

Furthermore, the controller 22 performs, when the switching determination unit 22b determines that the number of the workpieces 100 is less than the given threshold (No at step S102), the transfer processing (step S108) and terminates a series of steps in the rearrangement processing.

Figure 7:
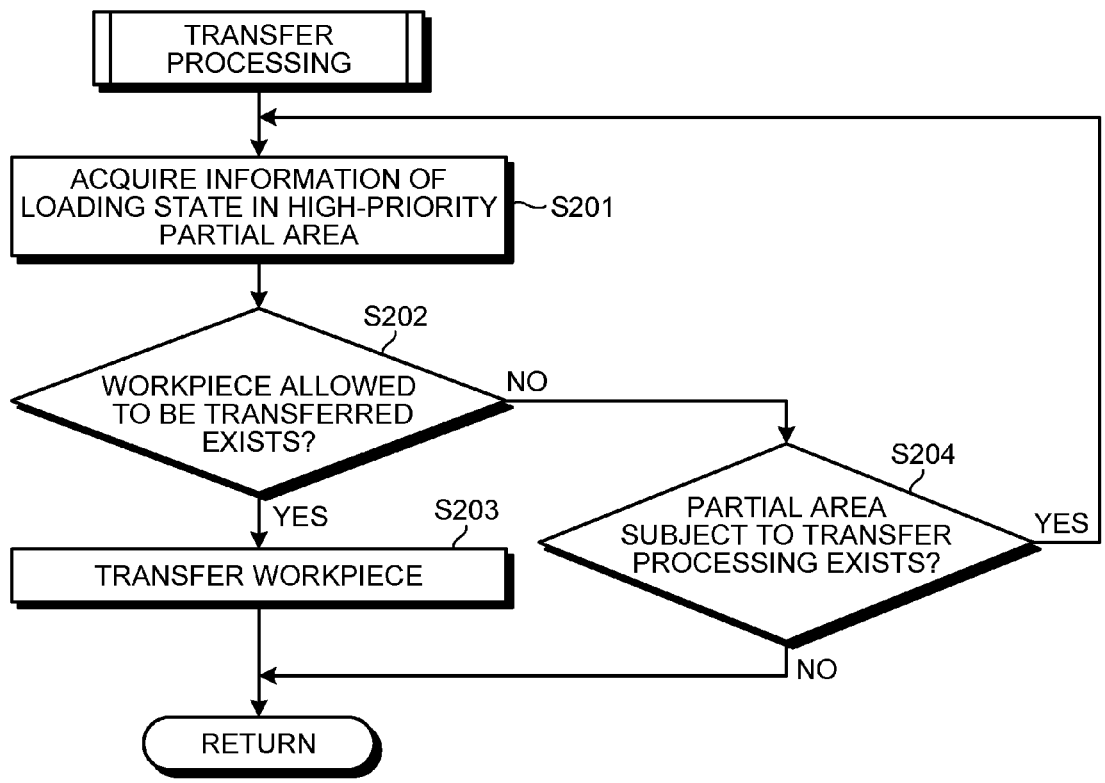
FIG. 7 is a flowchart illustrating processing procedures of a transfer processing.

Next, the processing procedures of the transfer processing performed by the robot system 1 is explained in conjunction with FIG. 7. FIG. 7 is a flowchart illustrating processing procedures of the transfer processing.

As illustrated in FIG. 7, the transfer candidate determination unit 22d acquires information of the loading state of the workpieces 100 placed in the high-priority area (step S201), and determines whether the workpiece 100 allowed to be transferred exists in such a partial area based on the acquired information of the loading state (step S202).

The transfer instruction unit 22g instructs, when the transfer candidate determination unit 22d determines that the workpiece 100 allowed to be transferred exists (Yes at step S202), the robot 10 to transfer the workpiece 100, and the robot 10 transfers the workpiece 100 (step S203). Then, the transfer instruction unit 22g terminates a series of steps in the transfer processing.

On the other hand, the transfer candidate determination unit 22d determines whether, when determining that the workpiece 100 allowed to be transferred does not exist (No at step S202), the partial area subject to the transfer processing exists (step S204).

Furthermore, the transfer candidate determination unit 22*d* repeatedly performs, when determining that the partial area subject to the transfer processing exists (Yes at step S204), the processing from step S201 to step S204 with respect to the next-highest-priority partial area.

Furthermore, the transfer candidate determination unit 22*d* terminates, when determining that the partial area subject to the transfer processing does not exist (No at step S204), a series of steps in the transfer processing.

As described above, in the present embodiment, the switching determination unit 22*b* determines that, when the number of the workpieces 100 on the conveyance passage 30 is equal to or greater than the given threshold, a sufficient number of the workpieces 100 that satisfies the demand for the workpieces 100 downstream of the conveyance passage 30 are supplied from the upstream side of the conveyance passage 30 and performs the rearrangement processing of the workpieces 100. Due to such a constitution, the workpieces 100 in the pallet 101 are rearranged thus realizing the loading state that the workpiece 100 can be taken out.

Due to such a constitution, in the robot system 1 according to the present embodiment, it is possible to reduce the total pickup time for the workpiece 100 loaded on the pallet 101 randomly.

Here, in the embodiment described above, the robot system 1 instructs the robot 10 to perform the operation of moving the workpiece 100 placed at the position close to the wall of the pallet 101 so as to rearrange the workpiece 100. However, the present embodiment is not limited to the above-mentioned embodiment.

For example, the robot system 1 may instruct the robot 10 to shake the pallet 101 or jet gas, so that the workpiece 100 is rearranged.

In addition, in the above-mentioned embodiment, the robot system 1 performs the rearrangement processing with respect to all partial areas subject to the rearrangement processing. However, the rearrangement processing may be terminated at the time when the workpiece 100 placed in a certain partial area is moved whereby the loading state that the workpiece 100 can be transferred is realized.

Furthermore, in the above-mentioned embodiment, in the robot system 1, the sensor 31 mounted on the conveyance passage 30 detects the number of the workpieces 100 accumulated on the conveyance passage 30. However, the robot system 1 may control the number of the workpieces 100 on the conveyance passage 30.

To be more specific, in the robot system 1, the number of the workpieces 100 transferred by the upstream-side robot 10 and the number of the workpieces 100 transferred by the downstream-side robot 50 are stored, and the difference between both numbers is controlled as the number of the workpieces 100 on the conveyance passage 30.

Furthermore, in the above-mentioned embodiment, the workpieces 100 illustrated in FIG. 1, FIG. 4B, FIG. 4C, and FIG. 5 are taken out from the pallet 101. However, the size or shape of the workpiece 100 is not limited to this embodiment.

In addition, in the above-mentioned embodiment, the robot system 1 sets priorities to the respective partial areas in descending order from the partial area further away from the wall surface of the pallet 101 and determines the workpiece 100 allowed to be transferred based on the priority set. However, when a sufficient number of the workpieces 100 that satisfies the demand for the workpieces 100 downstream of the conveyance passage 30 are supplied from the upstream side of the conveyance passage 30, the robot system 1 may purposefully instructs the robot 10 to transfer the workpiece 100 placed in the low-priority partial area whereby the robot 10 performs a transfer operation. In this manner, it is possible to extensively apply contents disclosed in this embodiment to the various robot systems.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
    a robot that transfers a workpiece loaded on a pallet;
    a conveyance passage along which the workpiece transferred by the robot is conveyed;
    a conveyance passage detection unit that detects an accumulated state of the workpiece accumulated on the conveyance passage;
    a switching determination unit that performs determination of switching between an operation of taking out the workpiece from the pallet and transferring the workpiece to the conveyance passage and an operation of rearranging the workpiece loaded on the pallet based on the accumulated state detected by the conveyance passage detection unit;
    a rearrangement instruction unit that instructs, when the switching determination unit determines to switch to the operation of rearranging the workpiece the robot to rearrange the workpiece.

2. The robot system according to claim 1, further comprising:
    a downstream-side robot that is installed downstream of the conveyance passage and acquires the workpiece from the conveyance passage.

3. The robot system according to claim 1, wherein
    the accumulated state detected by the conveyance passage determination unit is number of the workpiece accumulated on the conveyance passage, and
    the switching determination unit determines, when the number of the workpiece is equal to or greater than a given threshold, to switch to the operation of rearranging the workpiece.

4. The robot system according to claim 1, wherein the rearrangement instruction unit instructs, when the switching determination unit determines to switch to the operation of rearranging the workpiece the robot to rearrange the workpiece by moving the workpiece in a direction away from a wall surface of the pallet.

5. The robot system according to claim 1, further comprising:
    an image acquisition unit that divides the pallet into a plurality of partial areas and acquires an image in each partial area; and
    a transfer candidate determination unit that determines the workpiece to be transferred next based on a loaded state of the workpiece in the partial areas.

6. The robot system according to claim 5, wherein the transfer candidate determination unit determines the workpiece to be transferred next in the partial area with highest priority in which the workpiece is placed at a highest position.

7. The robot system according to claim 5, wherein the transfer candidate determination unit determines the workpiece to be transferred next while prioritizing the partial area that includes no wall surface of the pallet.

8. The robot system according to claim 7, wherein the transfer candidate determination unit determines, when the number of the workpiece detected by the conveyance passage detection unit is equal to or greater than a given threshold, the workpiece to be transferred next while prioritizing the partial area that includes a wall surface of the pallet.

9. A robot system comprising:
- a robot that transfers a workpiece loaded on a pallet;
- a conveyance passage along which the workpiece transferred by the robot is conveyed;
- a conveyance passage detection means for detecting an accumulated state of the workpiece accumulated on the conveyance passage;
- switching determination means for performing determination of switching between an operation of taking out the workpiece from the pallet and transferring the workpiece to the conveyance passage and an operation of rearranging the workpieces loaded on the pallet based on the accumulated state detected by the conveyance passage detection means; and
- rearrangement instruction means for instructing the robot to rearrange the workpiece when the switching determination means determines to switch to the operation of rearranging the workpiece.

* * * * *